United States Patent
Wardle

(10) Patent No.: US 9,718,344 B2
(45) Date of Patent: Aug. 1, 2017

(54) HYBRID VEHICLE POWERTRAIN

(71) Applicant: Jaguar Land Rover Limited, Coventry (GB)

(72) Inventor: David Wardle, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 105 days.

(21) Appl. No.: 14/652,566

(22) PCT Filed: Dec. 19, 2013

(86) PCT No.: PCT/EP2013/077317
§ 371 (c)(1),
(2) Date: Jun. 16, 2015

(87) PCT Pub. No.: WO2014/096154
PCT Pub. Date: Jun. 26, 2014

(65) Prior Publication Data
US 2015/0328973 A1    Nov. 19, 2015

(30) Foreign Application Priority Data

Dec. 19, 2012 (GB) .................................. 1222946.4

(51) Int. Cl.
*B60K 6/387* (2007.10)
*B60K 6/40* (2007.10)
(Continued)

(52) U.S. Cl.
CPC ................ *B60K 6/40* (2013.01); *B60K 6/387* (2013.01); *B60K 6/405* (2013.01); *B60K 6/48* (2013.01);
(Continued)

(58) Field of Classification Search
CPC . B60K 6/387; B60K 6/40; B60K 6/48; B60K 2006/4825; Y10S 903/904;
(Continued)

(56) References Cited

U.S. PATENT DOCUMENTS 6,781,272 B2 *   8/2004   Kahlon ................... B60K 6/26
                                                     180/65.25
2006/0289209 A1 * 12/2006  Grosspietsch .......... B60K 6/26
                                                     180/65.25
(Continued)

FOREIGN PATENT DOCUMENTS

CN       101683816 A       3/2010
CN       101683817 A       3/2010
(Continued)

OTHER PUBLICATIONS

Notification of First Office Action, Chinese Patent Application No. 201380065842.9, Oct. 10, 2016, 18 pages.
(Continued)

*Primary Examiner* — Richard Lorence
(74) *Attorney, Agent, or Firm* — Myers Bigel, P.A.

(57) ABSTRACT

A hybrid vehicle powertrain includes an internal combustion engine, an electric traction motor and a transmission. A first flexible coupling drivingly connects the internal combustion engine to the transmission, and a second flexible coupling drivingly connects the electric traction motor to the transmission.

14 Claims, 3 Drawing Sheets

(51) Int. Cl.
*F16D 3/06* (2006.01)
*B60K 6/405* (2007.10)
*B60K 6/48* (2007.10)

(52) U.S. Cl.
CPC ........ *F16D 3/06* (2013.01); *B60K 2006/4825* (2013.01); *B60Y 2400/426* (2013.01); *B60Y 2400/4242* (2013.01); *B60Y 2400/48* (2013.01); *B60Y 2400/607* (2013.01); *Y02T 10/6221* (2013.01); *Y02T 10/6252* (2013.01); *Y10S 903/904* (2013.01)

(58) Field of Classification Search
CPC ........ Y02T 10/6221; B60Y 2400/4242; B60Y 2400/426; B60Y 2400/48; B60Y 2400/607; F16D 3/06
See application file for complete search history.

(56) References Cited

U.S. PATENT DOCUMENTS

| | | |
|---|---|---|
| 2007/0007059 A1 | 1/2007 | Nomura et al. |
| 2008/0023287 A1* | 1/2008 | Thiede .................... B60K 6/26 192/48.1 |
| 2010/0081540 A1 | 4/2010 | Krause et al. |
| 2011/0154944 A1 | 6/2011 | Mueller |

FOREIGN PATENT DOCUMENTS

| | | | |
|---|---|---|---|
| CN | 102046408 A | 5/2011 | |
| DE | 101 21 917 A1 | 11/2001 | |
| DE | 10 2004 034393 A1 | 2/2006 | |
| DE | 10 2006 060874 A1 | 6/2008 | |
| DE | 102010030570 A1 | 12/2011 | |
| DE | 10 2010 030690 A1 | 1/2012 | |
| GB | 2 365 832 A | 2/2002 | |
| GB | 2454592 A * | 5/2009 | ............ B60K 6/387 |
| JP | 2006506935 A | 2/2006 | |
| JP | 2011183820 A | 9/2011 | |
| JP | 2011524292 A | 9/2011 | |
| WO | WO 2004/047255 A2 | 6/2004 | |

OTHER PUBLICATIONS

Notice of Reasons for Refusal, JP Patent Application No. 2015-548558, Jul. 5, 2016, 9 pages.

\* cited by examiner

HYBRID VEHICLE POWERTRAIN

RELATED APPLICATIONS

This application is a 35 U.S.C. §371 national stage application of PCT Application No. PCT/EP2013/077317, filed on Dec. 19, 2013, which claims priority from Great Britain Patent Application No. 1222946.4, filed on Dec. 19, 2012, the contents of which are incorporated herein by reference in their entireties. The above-referenced PCT International Application was published in the English language as International Publication No. WO 2014/096154 A2 on Jun. 26, 2014.

TECHNICAL FIELD

The present invention relates to a hybrid vehicle powertrain. Aspects of the invention relate to a powertrain, to a coupling and to a motor vehicle.

BACKGROUND OF THE INVENTION

It is known to provide a hybrid vehicle with an internal combustion engine for operation in conjunction with an electric traction motor. The internal combustion engine and the electric traction motor can operate independently of each other or together to increase the maximum torque output. One approach is to develop an integrated transmission in which the electric traction motor is incorporated into the transmission. However, a particular integrated transmission may not be suitable for all applications, requiring the development of an alternate transmission. It would be desirable, at least from a commercial perspective, to retain the option of using a conventional transmission (i.e. one which does not incorporate an integrated electric traction motor) in combination with a hybrid powerpack. This approach may prove problematic as conventional electric traction motors can be susceptible to damage when exposed to axial loading. A conventional transmission may, for example, generate axial loads due to changes in the fluid pressure within a torque converter at different operating speeds; or due to the front to back movement of an engine crank.

It is against this background that the present invention has been conceived. At least in certain embodiments, the present invention seeks to ameliorate or overcome at least some of the problems associated with known systems.

SUMMARY OF THE INVENTION

Aspects of the present invention relate to a hybrid vehicle powertrain; a coupling; and a motor vehicle.

According to a first aspect of the present invention there is provided a hybrid vehicle powertrain comprising:
an internal combustion engine;
an electric traction motor; and
a transmission;
wherein a first flexible coupling drivingly connects the internal combustion engine to the transmission; and a second flexible coupling drivingly connects the electric traction motor to the transmission. The first and second flexible couplings are both connected to a common input of said transmission. The first and second flexible couplings are arranged to provide driving connections (i.e. to deliver torque) from the internal combustion engine and the electric traction motor respectively to the transmission. The first and second flexible couplings are arranged to accommodate relative axial movement to reduce or inhibit the transferral of axial loads from the transmission to the internal combustion engine and/or the electric traction motor. The first flexible coupling and/or the second flexible coupling can thereby help to protect the electric traction motor from damage resulting from axial loads. At least in certain embodiments, the first and second flexible couplings can facilitate coupling of a hybrid vehicle powertrain to a conventional transmission. The first flexible coupling and/or the second flexible coupling can be resilient. The arrangement of the first and second flexible couplings can, at least in certain embodiments, manage axial load balance between multiple input devices.

The electric traction motor can typically withstand a lower axial loading than the internal combustion engine. The transferral of axial loads to the electric traction motor can be reduced by configuring the second flexible coupling to be more flexible than the first flexible coupling. In other words, the first flexible coupling can be stiffer than the second flexible coupling. In certain variants, this arrangement can be reversed such that the first flexible coupling is more flexible than the second flexible coupling.

The first and second flexible couplings can couple the internal combustion engine and the electric traction motor to a transmission input, such as a clutch plate or a torque converter. The first and second flexible couplings can both be connected to the transmission input. The clutch plate or the torque converter can be integrated into the transmission in conventional manner. For example, the clutch plate or the torque converter can be disposed within a transmission housing (which can be referred to as a bell housing).

The first flexible coupling can comprise a first flex plate. The second flexible coupling can comprise a second flex plate. The first and second flex plates can have a generally circular plan form, but this may vary for different designs. For example, the first and/or second flex plates can have a multi-lobe configuration. One or more holes can be provided in the first and/or second flex plates to reduce mass.

A drive shaft can be provided for outputting torque from the internal combustion engine to the transmission. The first flexible coupling can be connected to the drive shaft of the internal combustion engine.

The electric traction motor can comprise a rotor and a stator. The electric traction motor can comprise an output drive for outputting torque from the electric traction motor to the transmission. The second flexible coupling can be fixedly mounted to the output drive. The output drive can comprise an output shaft. The output shaft and the drive shaft of the internal combustion engine could, for example, be arranged concentrically. Alternatively, the rotor can form the output drive of the electric traction motor. At least in certain embodiments, the second flexible coupling can be fixedly mounted to the rotor.

The drive shaft and the output drive can be arranged coaxially so as to rotate about a common axis. The first and second flexible couplings can be arranged, in use, also to rotate about said common axis. An offset can be maintained between the first and second flexible couplings along said common axis. The first and second couplings can be arranged substantially parallel to each other. The first and second flexible couplings can be connected to each other, for example at or proximal to their radially outer edge. The first and second flexible couplings can be connected to the transmission input by one or more mechanical fasteners, such as threaded bolts. The first and second flexible couplings can be joined to each other by said one or more mechanical fasteners. Alternatively, the first and/or second flexible couplings could be integral with said transmission input.

The electric traction motor can have an annular configuration in transverse cross-section which defines a central aperture through which the drive shaft extends.

A clutch can be provided for selectively engaging/disengaging the drive shaft. The clutch can be a push or pull type clutch. An operating mechanism can be provided for actuating the clutch. The operating mechanism can be disposed radially outwardly of the drive shaft, for example at least partially within the central aperture of said electric traction motor (between the drive shaft and the electric traction motor). The operating mechanism can comprise a hydraulic chamber for operating an actuator. The hydraulic chamber can be annular in transverse section. A longitudinal axis of the hydraulic chamber could be arranged coaxial with a longitudinal axis of the drive shaft. The hydraulic chamber can, for example, be disposed around the drive shaft. The actuator can comprise a cylindrical member extending around the drive shaft for engaging a clutch plate.

The electric traction motor could be a radial flux traction motor. Alternatively, the electric traction motor can be an axial flux traction motor. The axial flux traction motor can provide a high torque density and can have a relatively small depth. This arrangement is advantageous as the reduced length of the internal combustion engine and the transmission can permit either longitudinal (North/South) or transverse (East/West) powertrain configurations. At least in certain embodiments, the axial flux traction motor can be incorporated into the casing of the internal combustion engine.

In certain variants, the powertrain may comprise a third flexible coupling, such as a third flex plate. The third flexible coupling could be arranged to couple a second electric traction motor to the transmission. The second electric traction motor could, for example, be a generator operable to output a tractive force.

According to a further aspect of the present invention there is provided a hybrid vehicle powertrain comprising:
- a first power generator;
- a second power generator; and
- a transmission;
- wherein a first flexible coupling drivingly connects the first power generator to the transmission; and
- a second flexible coupling drivingly connects the second power generator to the transmission,
- wherein the first and second flexible couplings are both connected to a common input of said transmission.

According to a still further aspect of the present invention there is provided a dual coupling for connecting first and second power generators to a transmission; the dual coupling comprising:
- a first flexible coupling for drivingly connecting the first power generator to the transmission; and
- a second flexible coupling for drivingly connecting the second power generator to the transmission. The first and second flexible couplings are both connected to a common input of said transmission. The first power generator can be an internal combustion engine. The second power generator can be an electric traction motor. The first and second power generators can form a hybrid powertrain. The dual coupling can connect the first and second power generators to a single transmission. For example, the dual coupling can connect the first and second power generators to a clutch plate or a torque converter. The torque converter can be provided within the transmission, for example as an integrated component.

The first flexible coupling can comprise a first flex plate. The second flexible coupling can comprise a second flex plate. The first and second flexible couplings can be arranged coaxially. The first and second flexible couplings can be axially offset from each other.

In an alternate arrangement, the first and second power generators could both be electric motors. For example, an electric generator could be configured selectively to operate as a traction motor to supplement a dedicated traction motor. One of said first and second power generators could equally be a mechanical power generator, such as a flywheel.

A further aspect of the present invention relates to a vehicle powertrain incorporating a dual coupling of the type described herein.

The term powertrain used herein refers to the vehicle powerpack and transmission. The powerpack is made up of one or more machines operable to output torque to provide a tractive force for propelling the vehicle. The powerpack can be a hybrid arrangement, for example comprising an internal combustion engine and one or more electric traction motors.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying Figures, in which.

DETAILED DESCRIPTION

Figure 1:
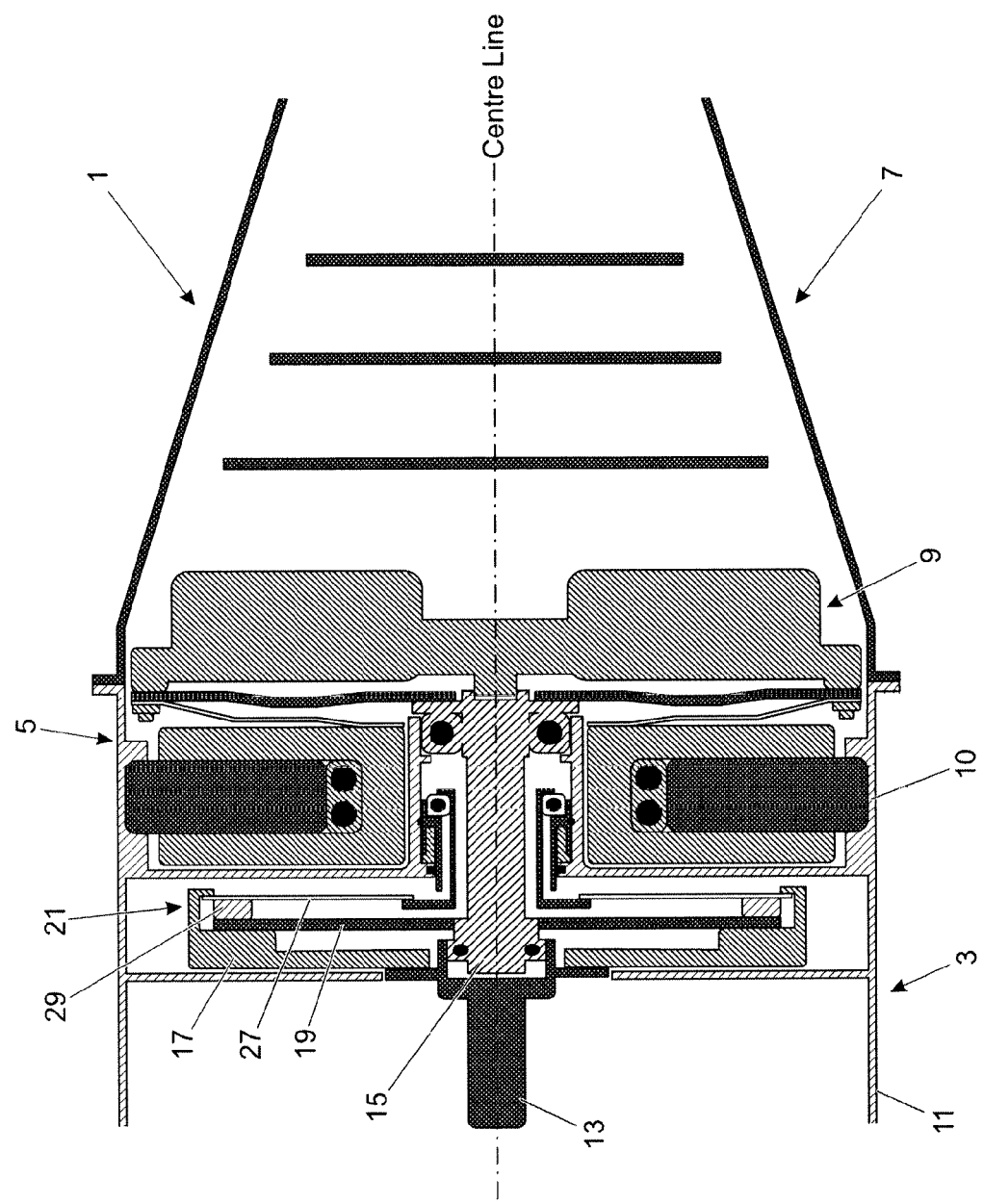
FIG. 1 shows a schematic cross-sectional view of a hybrid vehicle powertrain in accordance with an embodiment of the present invention.
Figure 2:
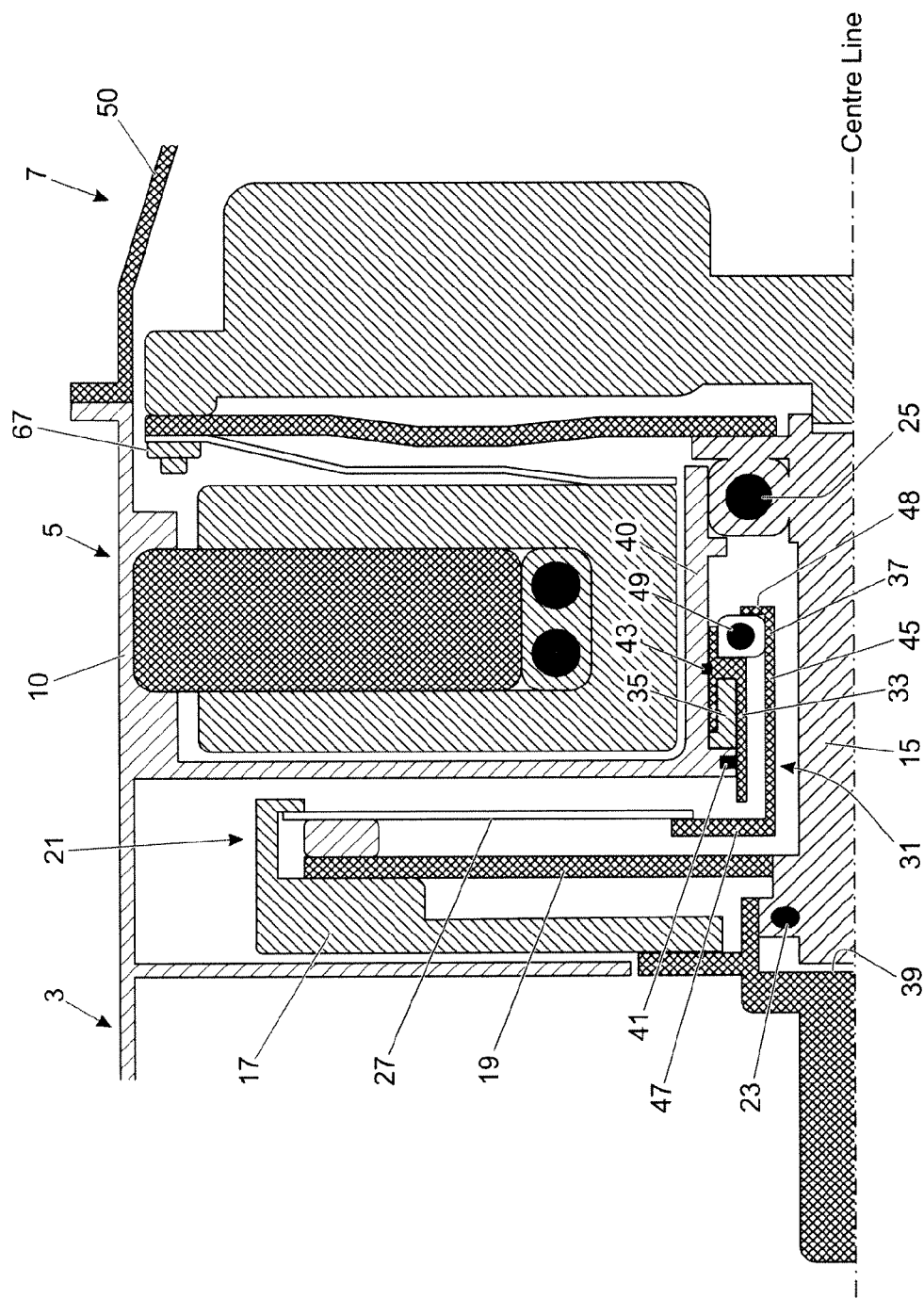
FIG. 2 shows an enlarged view of the clutch arrangement for coupling the internal combustion engine to an input shaft.
Figure 3:
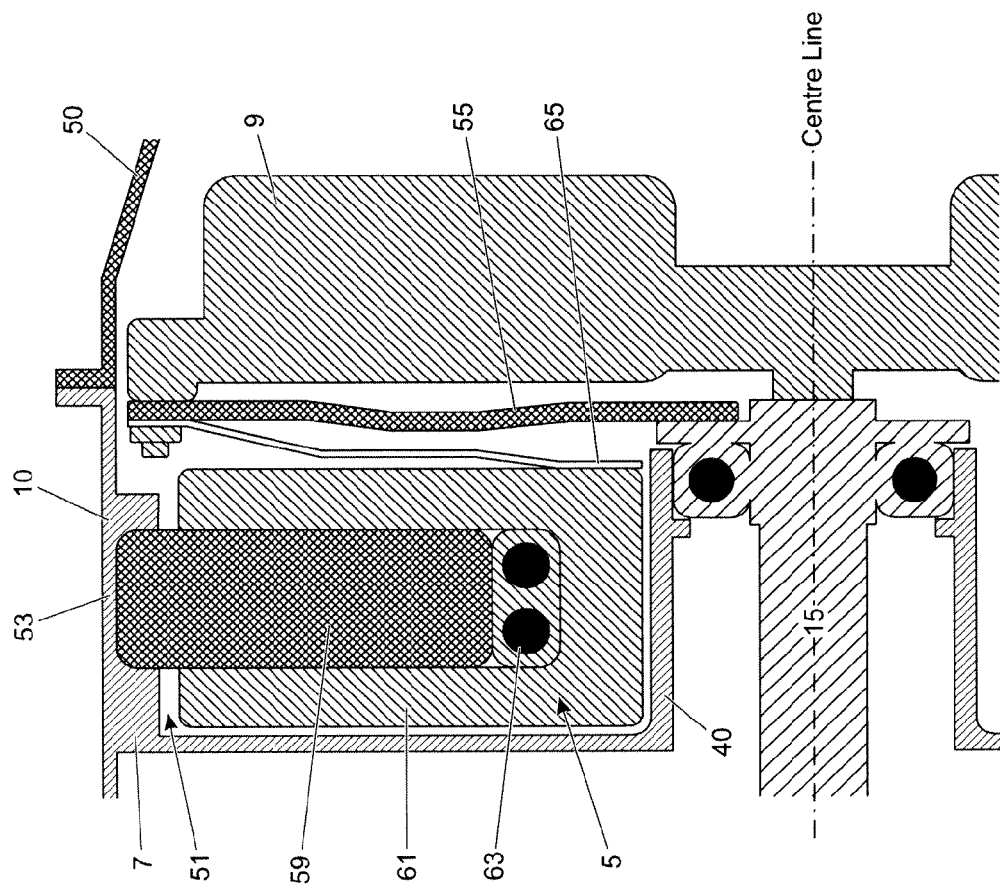
FIG. 3 shows an enlarged view of the coupling to the torque converter shown in FIG. 1.

A hybrid powertrain 1 for a motor vehicle (not shown) in accordance with an embodiment of the present invention will now be described with reference to FIGS. 1, 2 and 3. The powertrain 1 comprises an internal combustion engine 3 (only shown schematically) and an electric machine 5. As shown in FIG. 1, the internal combustion engine 3 and the electric machine 5 are coupled to a transmission 7 having an integrated torque converter 9. The transmission 7 in the present embodiment is an automatic transmission, but it could equally be a manual transmission.

The electric machine 5 is a traction motor for providing a tractive force to propel the vehicle. The electric machine 5 comprises a first casing 10 disposed between the internal combustion engine 3 and the transmission 7. The internal combustion engine 3 comprises a second (engine) casing 11 and, in the present embodiment, the first casing 10 is mounted to the second casing 11. It will be appreciated that the first and second casings 10, 11 could be integrated into a single casing.

The internal combustion engine 3 is of conventional design and comprises a crankshaft 13 for outputting torque. An input shaft 15 is coupled to the crankshaft 13 to deliver an input torque to the transmission 7. A flywheel 17 is fixedly mounted to the crankshaft 13. A clutch disc 19 is fixedly mounted to the input shaft 15 and a clutch 21 is provided selectively to couple the crankshaft 13 to the input shaft 15. The input shaft 15 is rotatably mounted on first and second shaft bearings 23, 25.

The clutch 21 in the present embodiment is a hydraulic pull type clutch. As shown most clearly in FIG. 2, the clutch 21 comprises a pressure plate 27, an annular friction pad 29, and a pull-release mechanism 31. The pressure plate 27 forms a flexible coupling diaphragm arranged to apply a spring pressure to engage the friction pad 29. The pull-release mechanism 31 comprises a piston 33, a hydraulic chamber 35 and a clutch actuator 37. The piston 33 is operable to control the axial movement of the clutch actuator 37, thereby controlling engagement of the pressure plate 27. A control valve arrangement (not shown) is provided for controlling the hydraulic fluid pressure within the hydraulic chamber 35 to control operation of the piston 33. In the present arrangement, an increase in the fluid pressure within the hydraulic chamber 35 advances the piston 33 (travelling from left to right in the illustrated arrangement). A return spring (not shown) is disposed within the hydraulic chamber 35 to bias the piston 33 towards a retracted position (travelling from right to left in the illustrated arrangement).

The first shaft bearing 23 is disposed in a cylindrical cupped recess 39 (referred to as the crank palm) formed in an end of the crankshaft 13. The second shaft bearing 25 is mounted in an input shaft support 40 in the form of a tubular extension formed integrally with the first casing 10 of the electric machine 5. The pull-release mechanism 31 is disposed within the input shaft support 40 and arranged concentrically around the input shaft 15. The hydraulic chamber 35 is formed between the piston 33 and an inside wall of the input shaft support 40. First and second circular seals 41, 43 are provided between the piston 33 and the inside wall of the input shaft support 40 to seal the hydraulic chamber 35.

The clutch actuator 37 comprises a cylindrical member 45 disposed concentrically around the input shaft 15. A first collar 47 is provided at a first end of the cylindrical member 45 for engaging the pressure plate 27; and a second collar 48 is provided at a second end of the cylindrical member 45 for engaging the piston 33. A clutch release bearing 49 is disposed between the piston 33 and the second collar 48 to accommodate rotational movement of the clutch actuator 37 with the input shaft 15. The cylindrical member 45 is movable axially relative to the input shaft 15 to operate the clutch 21.

The input shaft 15 is coupled to the torque converter 9 which is integrated into the transmission 7. Specifically, the torque converter 9 is disposed within a transmission housing 50 (also referred to as a bell housing). As shown in FIG. 3, a first flex plate 55 forms a driving coupling between the input shaft 15 and the torque converter 9. The first flex plate 55 is a flexible coupling member configured to transmit torque to the torque converter 9 whilst permitting relative axial movement. The first flex plate 55 can thereby inhibit the transmission of axial loads between the internal combustion engine 3 and the transmission 7.

The electric machine 5 is disposed in a chamber 51 formed in the first casing 10. The chamber 51 comprises a cylindrical outer sidewall 53 arranged concentrically with the input shaft support 40. Thus, the chamber 51 has a generally toroidal shape. In the present embodiment the electric machine 5 is an axial flux traction motor. This type of electric machine 5 is suited for hybrid vehicles as it can provide a high torque density. Moreover, an axial flux traction motor can be configured with a relatively small axial length which enables the electric machine 5 to be disposed within the chamber 51 formed in the first casing 10. Thus, the electric machine 5 can be packaged between the internal combustion engine 3 and the transmission 7. This configuration is particularly advantageous as it enables a conventional (non-hybrid) transmission (i.e. a transmission without an integrated electric traction motor) to be utilised.

The electric machine 5 comprises a fixed stator 59 and a rotor 61. The stator 59 is fixedly mounted to the sidewall 53 of the first casing 10. A bearing 63 is mounted to the stator 59 to accommodate rotational movement of the rotor 61 relative to the stator 59. The rotor 61 provides a drive output from the electric machine 5. A second flex plate 65 is fixedly mounted to the rotor 61 and connects the electric machine 5 to the torque converter 9. The second flex plate 65 is a flexible coupling member which enables the transmission of torque to the torque converter 9 whilst permitting relative axial movement between the electric machine 5 and the torque converter 9. In the present embodiment the second flex plate 65 is less stiff than the first flex plate 55 to reduce the transmission of axial loads to the rotor 61. This arrangement is desirable as the electric machine 5 is more susceptible to damage from axial loading that the internal combustion engine 3.

The first and second flex plates 55, 65 are coupled to the torque converter 9 by a series of mechanical fasteners 67 (such as threaded bolts) disposed about their respective circumferences. It will be appreciated, therefore, that the first and second flex plates 55, 65 remain connected to the torque converter 9. However, by controlling the operation of the electric machine 5 and/or the clutch 21, the internal combustion engine 3 and the electric machine 5 can operate independently of each other or in combination. The electric machine 5 can be de-energised to allow the internal combustion engine 3 to deliver all of the output torque to the transmission 7 (via the first flex plate 55). When the electric machine 5 is de-energised, the internal combustion engine 3 rotates the rotor 61 with the input shaft 15. Conversely, the clutch 21 can be dis-engaged to de-couple the input shaft 15 from the crankshaft 13, thereby allowing the electric machine 5 to deliver all of the output torque to the transmission 7 (via the second flex plate 65). When the clutch 21 is disengaged, the electric machine 5 rotates the input shaft 15 and the clutch disc 19 without rotating the crankshaft 13. At least in certain applications, the internal combustion engine 3 and the electric machine 5 can operate together to deliver torque to the transmission 7 simultaneously via the first and second flex plates 55, 65.

The operation of the vehicle powertrain will now be described with reference to FIGS. 1 and 2. The crankshaft 13 is driven by the internal combustion engine 3 in conventional manner. The clutch 21 is operated by the pull-release mechanism 31 selectively to engage/disengage the crankshaft 13. The piston 33 is spring-biased towards an engaged position in which the pressure plate 27 biases the friction pad 29 against the clutch disc 19, thereby engaging the clutch 21 and coupling the crankshaft 13 to the input shaft 15. The clutch 21 is engaged to transfer torque from the internal combustion engine 3 to the transmission 7 via the input shaft 15. To disengage the clutch 21, the hydraulic fluid pressure within the hydraulic chamber 35 is increased to advance the piston 33. The cylindrical actuator 45 is thereby displaced and applies an axial (pulling) force to the pressure plate 27, thereby disengaging the clutch 21 and de-coupling the crankshaft 13 to the input shaft 15. In use, the clutch 21 can be disengaged to enable the electric machine 5 to operate independently of the internal combustion engine 3. By de-coupling the input shaft 15 from the crankshaft 13, the internal combustion engine 3 can be switched off to permit operation in a full electric mode whereby the electric machine 5 exclusively provides a tractive force to propel the vehicle.

The input shaft 15 is coupled to the torque converter 9 by the first flex plate 55. The first flex plate 55 transfers torque to the torque converter 9 whilst accommodating relative movement between the input shaft 15 and the torque converter 9. The electric machine 5 is disposed concentrically around the input shaft 15. The electric machine 5 is connected to the torque converter 9 by a second flex plate 65. Again, the second flex plate 65 is a flexible coupling member which enables the delivery of torque from the electric machine 5 to the torque converter 9 whilst accommodating axial movement. In the present embodiment, the second flex plate 65 is a more flexible coupling than the first flex plate 55 to reduce the application of axial loading to the rotor 61 of the electric machine 5.

At least in certain embodiments, the combined length of the internal combustion engine 3, the electric traction motor 5 and the transmission 7 is reduced, thereby increasing the range of applications in which the vehicle powertrain can be implemented. The vehicle powertrain can be configured such that the internal combustion engine 3 and the transmission 7 are arranged transversely (East-West) or longitudinally (North-South) within a vehicle.

The present embodiment has been directed to an electric machine 5 in the form of an axial flux traction motor. However, at least certain aspects of the present invention can be applied more broadly, for example to radial flux traction motors. The present invention has been described with reference to a single electric traction motor, but it will be appreciated that more than one electric traction motor could be coupled to the transmission 7 via the second flex plate 65. The electric traction motors could, for example, be disposed within the first casing 10 around the input shaft 15.

It will be appreciated that various changes and modifications can be made to the powertrain described herein. For example, the invention has been described with reference to a hybrid vehicle powertrain, but the first and second flex plates 55, 65 could be employed for connecting two power generators of the same type (for example two electric traction motors) to the transmission 7. Moreover, more than two of said flex plates 55, 65 could be provided for certain applications. Further aspects of the present invention are outlined in the following numbered paragraphs.

1. A hybrid vehicle powertrain comprising:
   an internal combustion engine;
   an electric traction motor; and
   a transmission;
   wherein a first flexible coupling drivingly connects the internal combustion engine to the transmission; and
   a second flexible coupling drivingly connects the electric traction motor to the transmission
   wherein the first and second flexible couplings are both connected to a common input of said transmission.

2. A hybrid vehicle powertrain as described in paragraph 1, wherein the first flexible coupling is less flexible than the second flexible coupling.

3. A hybrid vehicle powertrain as described in paragraph 1, wherein the first flexible coupling comprises a first flex plate; and the second flexible coupling comprises a second flex plate.

4. A hybrid vehicle powertrain as described in paragraph 1, wherein said common input is connected to a torque converter.

5. A hybrid vehicle powertrain as described in paragraph 1, wherein the first flexible coupling is connected to a drive shaft of the internal combustion engine; and a clutch is provided for selectively engaging/disengaging the drive shaft.

6. A hybrid vehicle powertrain as described in paragraph 5, wherein the clutch comprises an operating mechanism arranged coaxially with the drive shaft of the internal combustion engine.

7. A hybrid vehicle powertrain as described in paragraph 6, wherein the electric traction motor is disposed radially outwardly of the operating mechanism.

8. A hybrid vehicle powertrain as described in paragraph 5, wherein the clutch is a pull-release clutch.

9. A hybrid vehicle powertrain as described in paragraph 1, wherein the electric traction motor comprises a rotor and the second flexible coupling is fixedly mounted to said rotor.

10. A hybrid vehicle powertrain as described in paragraph 1, wherein the electric traction motor is an axial flux traction motor.

11. A vehicle comprising a hybrid vehicle powertrain as described in paragraph 1.

12. A dual coupling for connecting first and second power generators to a transmission; the dual coupling comprising:
    a first flexible coupling for drivingly connecting the first power generator to the transmission; and
    a second flexible coupling for drivingly connecting the second power generator to the transmission
    wherein the first and second flexible couplings are both connected to a common input of said transmission.

13. A dual coupling as described in paragraph 12, wherein the first flexible coupling comprises a first flex plate and the second flexible coupling comprises a second flex plate.

14. A dual coupling as described in paragraph 12, wherein the first power generator is an internal combustion engine; and the second power generator is an electric traction motor.

15. A vehicle powertrain comprising a dual coupling as described in paragraph 12.

The invention claimed is:
1. A hybrid vehicle powertrain, comprising:
   an internal combustion engine;
   an electric traction motor; and
   a transmission;
   wherein a first flexible coupling drivingly connects the internal combustion engine to the transmission; and
   a second flexible coupling drivingly connects the electric traction motor to the transmission,
   wherein the first and second flexible couplings are both connected to a common input of the transmission, and
   wherein the first flexible coupling is less flexible than the second flexible coupling.

2. The hybrid vehicle powertrain of claim 1, wherein the first flexible coupling comprises a first flex plate, and wherein the second flexible coupling comprises a second flex plate.

3. The hybrid vehicle powertrain of claim 1, wherein the common input is connected to a torque converter.

4. The hybrid vehicle powertrain of claim 1, wherein the first flexible coupling is connected to a drive shaft of the internal combustion engine, and wherein a clutch is provided for selectively engaging/disengaging the drive shaft.

5. The hybrid vehicle powertrain of claim 4, wherein the clutch comprises an operating mechanism arranged coaxially with the drive shaft of the internal combustion engine.

6. The hybrid vehicle powertrain of claim 5, wherein the electric traction motor is disposed radially outwardly of the operating mechanism.

7. The hybrid vehicle powertrain of claim 4, wherein the clutch is a pull-release clutch.

8. The hybrid vehicle powertrain of claim 1, wherein the electric traction motor comprises a rotor and the second flexible coupling is fixedly mounted to the rotor.

9. The hybrid vehicle powertrain of claim 1, wherein the electric traction motor is an axial flux traction motor.

10. A dual coupling for connecting first and second power generators to a transmission, the dual coupling comprising:

a first flexible coupling for drivingly connecting the first power generator to the transmission; and a second flexible coupling for drivingly connecting the second power generator to the transmission wherein the first and second flexible couplings are both connected to a common input of the transmission, and wherein the first flexible coupling is less flexible than the second flexible coupling.

11. The dual coupling of claim 10, wherein the first flexible coupling comprises a first flex plate and the second flexible coupling comprises a second flex plate.

12. The dual coupling of claim 10, wherein the first power generator is an internal combustion engine, and wherein the second power generator is an electric traction motor.

13. A vehicle powertrain comprising the dual coupling of claim 10.

14. A vehicle comprising the powertrain of claim 1.

* * * * *